Dec. 22, 1953 E. P. JONES 2,663,609
SPEED RECORDER
Filed July 9, 1948 2 Sheets-Sheet 1
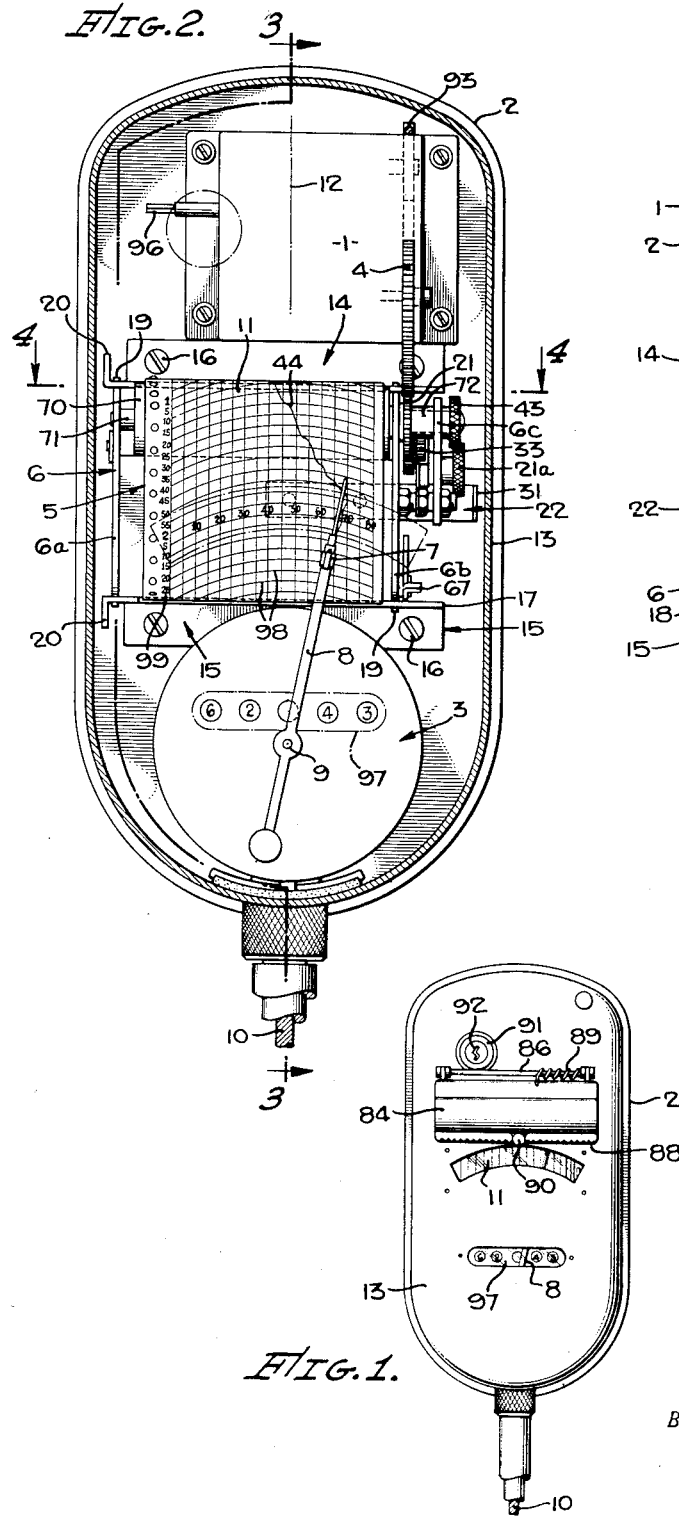
FIG. 2.
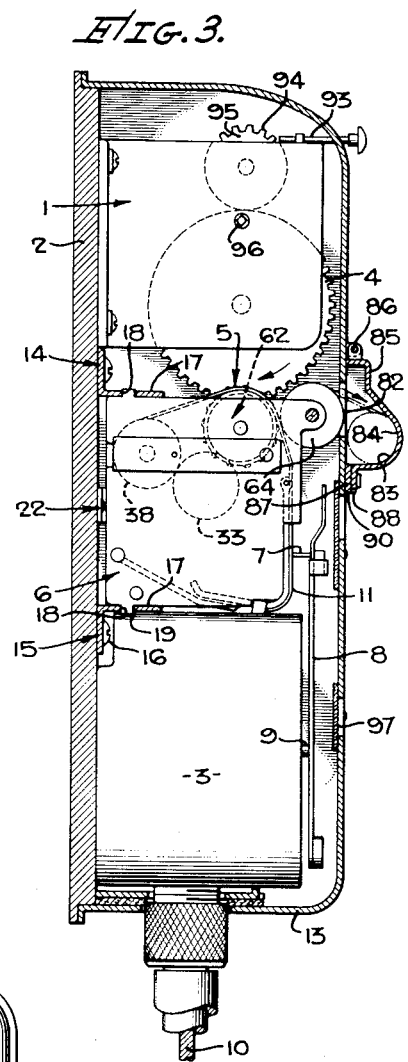
FIG. 3.
FIG. 1.
INVENTOR.
EDWIN P. JONES,
BY Francis D. Ammen
ATTORNEY.

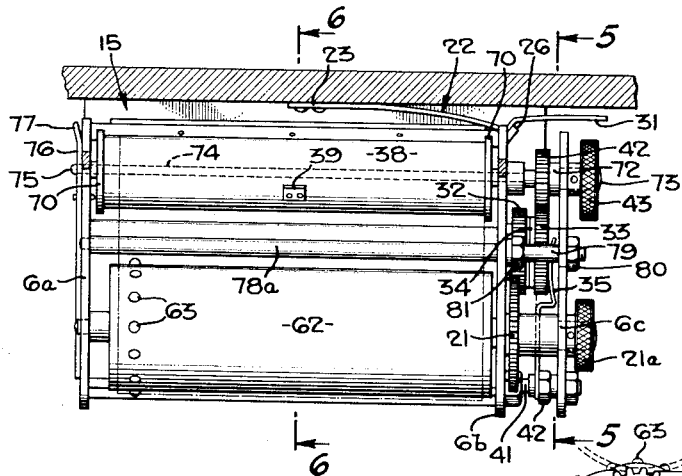

Patented Dec. 22, 1953

2,663,609

UNITED STATES PATENT OFFICE 2,663,609

SPEED RECORDER

Edwin P. Jones, Merced, Calif.

Application July 9, 1948, Serial No. 37,751

13 Claims. (Cl. 346—24)

This invention relates to a speed recorder such as employed for example, on automobiles, and particularly on trucks, to enable a continuous record of the speed of the truck to be made. However, the use of the invention is not limited to trucks, and it could be employed in any situation where a stylus controlled by a moving object, cooperates with a recording web to produce a continuous record of the speed at all times.

Specially constructed mechanism of this character is relatively expensive. One of the objects of this invention is to produce a speed recorder in which web-carrying and driving mechanism of my invention is employed, is detachably mounted between a motor and a speedometer, and to provide a construction which will enable a clock motor of common construction and a conventional speed indicator of types now available on the market, to be readily adapted to my purposes.

Another object of the invention is to provide a simple construction for the web-carrying mechanism, which will enable it to be readily placed in its driving position between the motor and the speed indicator to enable the web carried by it to co-operate with the recording stylus that moves to and fro in accordance with the speed of the vehicle.

Another object of the invention is to construct the web-driving mechanism in such a way that the supply roll of web can be readily put in place and threaded through the driving mechanism for it by a few very simple operations.

In using recording instruments of this type on trucks or other vehicles, these instruments usually function to produce a continuous long web on which the speed of the vehicle at different times of the day, is recorded on the web as it passes under the recording stylus of the instrument. One of the objects of this invention is to provide an instrument of that type with auxiliary means which can function to collect a relatively short web if desired. This enables a speed record of relatively short drives of the vehicle to be made and used alternately when desired, instead of the regular take-up roll that usually functions to collect all of the recorded web.

Further objects of the invention will appear hereinafter.

The invention consists in the novel parts and combinations of parts to be described hereinafter, all of which contribute to produce an efficient speed recorder.

A preferred embodiment of the invention is described in the following specification, while the broad scope of the invention is pointed out in the appended claims.

In the drawing:

Fig. 1 is a plan or front elevation of the instrument embodying my invention.

Fig. 2 is also a plan, but is upon a larger scale, and merely shows the mechanism of the instrument in plan, while the housing or cover of the instrument is shown with its wall in section.

Fig. 3 is a vertical section taken about on the line 3—3 of Fig. 2.

Fig. 4 is a horizontal section taken about on the line 4—4 of Fig. 2, and looking downwardly on this view.

Fig. 5 is a fragmentary view, and is a section taken about on the line 5—5 of Fig. 4, particularly illustrating the means for removably mounting the recorder frame and web-driving mechanism on the base of the instrument. In this view, portions of the base are broken away.

Fig. 6 is a vertical section taken about on the line 6—6 of Fig. 4, and further illustrating the web-driving mechanism carried on the recorder frame, and particularly illustrating the means for supporting and guiding the supply roll of the web.

Fig. 7 is a fragmentary view, and is a horizontal section taken about on the line 7—7 of Fig. 5, and particularly illustrating details of latching means that I may employ for holding the recorder frame in its driving position, connected up with the motor to drive the recording web.

Fig. 8 is a section taken about on the line 8—8 of Fig. 6, looking upwardly, to illustrate more fully the details of guiding means that I prefer to employ for guiding the recorder frame into, and out of, its driving position.

Referring more particularly to the parts, and especially to Figs. 1 to 3, inclusive, I employ a clock motor 1 of any suitable type, which I mount rigidly on a base 2 of oblong shape, toward the other end of which a speed indicator 3 is also secured on the base.

In applying my invention, I modify the clock motor 1 by providing it with a driving wheel or gear 4 that projects out from its casing into the space between the clock motor and the speed indicator 3. In this space between these two instruments, I mount the web-driving mechanism indicated generally by the reference numeral 5. This mechanism includes a recorder frame 6 that carries means for carrying a supply roll of web, and for driving the same to advance it past the stylus 7 on an indicator arm 8 that is attached to a shaft 9 that projects upwardly or outwardly from the speed indicator. This speed indicator may be of any suitable conventional type, and driven by a flexible shaft 10 from the transmission of the vehicle, and this recording arm 8 functions in the usual manner to move to and fro across the recording web 11, which is driven by its driving mechanism and preferably in the same direction as the axial line 12 of the complete instrument, which line may be the geometrical axis of the housing or cover 13 of the complete instrument.

In accordance with my invention, I provide means for enabling the recorder frame 6 to be moved into driving position in the space between the motor and the speed indicator 3, and in the present instance, I prefer to slide this frame laterally into position. So I provide guide members for this purpose, preferably attached to the base 2. Of course, this movement of web mechanism into driving position can only be accomplished before the housing 13 is placed in position on the base 2. In the present instance, I prefer to provide two guide brackets 14 and 15 (see Fig. 3) which, as illustrated, are of angular cross-section so as to provide flanges that can be attached to the base by suitable small screws 16 or other fastening devices. These brackets are of bar form, and present outwardly projecting webs 17 disposed parallel to each other, and each of these webs is provided with a guide slot 18.

The guide slots 18 are adapted to receive short tongues 19, respectively, that project into the same from the adjacent edges of the end plates 6a and 6b that constitute the end plates of the recorder frame 6. The guide bracket 14 is illustrated in detail in Fig. 8.

The recorder frame 6 is slid into driving position from the left side as viewed in Fig. 2. Hence the slots 18 are open at their left end, and at the left end of each guide bracket the plate material out of which the bracket is formed, is preferably bent laterally to form a flange 20. These flanges are of assistance in enabling the operator of the instrument to guide the recorder frame 6 into position. The driving mechanism for the web 11 is located at the right end of the recorder frame 6, and includes a gear wheel 21 that is adapted to mesh with the driving gear wheel 4 of the motor (see Fig. 2). When the recorder frame 6 is slid forward or toward the right into its driving position, as soon as the gear 21 aligns with the gear 4, the recorder frame will be automatically latched in this position. For this purpose I prefer to provide a latch 22 in the form of a leaf spring, one end of which is attached at 23 to the outer face of the base 2 (see Fig. 7). The body of this leaf spring curves away from the face of the base 2, and is bent so as to form a rudimentary tooth 24 which is adapted to snap into place in a notch 25 that is formed in the adjacent edge of the inner or right-hand frame plate 6b of the recorder frame 6. This notch 25 may be formed by striking a short tongue 26 from the edge of the plate, which is bent over into an inclined position, making a small angle with the plane in which the plate 6b lies. At the point 27 which is at the left side of the end of the rudimentary tooth 24, the width of the spring 22 is slightly less than the width of the notch 28 which is left in the material of the plate when the tongue 26 is struck out of it and bent beyond this point, that is to say, at the point 29, the spring 22 is slightly wider so as to provide shoulders at the point of the tooth 24 to engage against the right-hand face 30 of the plate 6b. Beyond the tooth 24 this spring 22 is formed with an extension 31, which is far enough away from the base 2 to enable the operator of the instrument to move the spring sufficiently toward the base to enable its tooth 24 to release itself from the frame plate 6b. A knob 21a is rigidly connected to roller 62 for rotating it when gear 21 is out of mesh with its driving gear 4.

Referring now particularly to Figs. 2 and 5, the gear wheel 21 is the gear that receives the drive from the motor-driven gear wheel 4 with which it meshes. The inner and lower side or edge of this gear wheel 21, drives a gear wheel 32 which is coaxial with a similar gear wheel 33, and between these two gear wheels 32 and 33 a friction clutch 34 is formed by providing the adjacent faces of these two gears with discs of fiber, leather, or other suitable material that will develop friction when one of the discs rotates against the other. The outer disc of the gear wheel 33 is pressed yieldingly toward the corresponding disc of the gear wheel 32 by a suitable leaf spring 35, the inner end of which is forked to form a yoke 36 that connects to a concentric undercut pin head 37 on the axis of the gear wheel 33. The friction clutch 34 is necessary in order to drive a regular take-up roller 38 on which the end of the web 11 winds up. The face of this roller 38 should be provided with a small clip 39 as indicated in Fig. 4, to enable the folded end of the web to be attached to the roller to enable the web to wind upon it.

Referring again to the spring 35, it should be noted that this spring is attached by a small screw 40 to the adjacent frame plate 6b, and the outer end of this spring is forked into a yoke to take over a pin or threaded stud 41 that carries a nut 42 that can be adjusted in either direction to control the amount of pressure that the other end of the spring exerts against the outer face of the gear wheel 33.

The drive to the take-up roller 38 is taken off of the gear wheel 33 to the gear wheel 42 that is rigid with the head of the roller 38. If desired, the shaft or head of the roller 38 may be provided with a knurled knob 43 for rotating this take-up roller at will in either direction, when there is no web wound upon it, or when the web-driving mechanism is not connected to the mechanism of the clock motor 1.

In using this instrument after a run of the truck or vehicle carrying it has been completed, the operator of the vehicle, or the supervisor, may tear off a portion of the web which has been recorded upon by the moving stylus 7 that moves transversely to the web according to the speed of the vehicle, tracing a record line 44 upon the web as indicated in Fig. 2. In order to facilitate tearing off the web, I provide a severing device 45 (see Fig. 6) which is in the form of a frame plate secured to a transverse shaft 46, the ends of which are turned down to form pivot pins or pintles such as the pintle 47 illustrated in Fig. 5. These pintles are rotatably mounted in the end plates 6a and 6b of the recorder frame. The plate that forms the body of the severing device 45 may be cut away as indicated at 48, to lighten it, and is covered on its upper side by a thin wear plate 49, the upper face of which is in contact with the web indicated by the dotted line 50 in Fig. 6, that passes between this face plate or wear plate 49 and a part of the tracker-board which will be presently described. A spring 45a urges the severing device upwardly.

As illustrated in Fig. 6, this tracker-board 51 includes a fixed upper panel 52 (see Fig. 6) and a lower portion or platen 53 which is in the form of a plate, the outer face of which is in line with the outer face of the fixed panel 52. This platen 53 is made of sheet material, and its upper edge is mounted on a hinge connection or pivot connection 54, the axis of which extends longitudinally with the axis of the pocket 55 formed in the forward and lower part of the recorder frame to carry the supply roll 56 of web. This pocket 55 is defined by means of a fixed angular wall 57 having a horizontal extension beneath which the roll 56 is placed, and having a vertical extension 58 at the back, that limits movement of the roll 56 toward the base 2 of the instrument. By reason of the presence of the hinge connection 54, the platen 53 can be swung outwardly and upwardly on the hinge connection so as to open the pocket 55 to enable a supply roll of web to be placed within it. It is necessary to provide a support for the under side of the roll, and I prefer to accomplish this by forming an integral extension 59 that projects rearwardly from the body of the platen 53 so that it will operate as a cradle or rest for the under side of the roll 56. The under side of the extension 59 is preferably provided with two small guides or guide projections 60 between which the web passes. In other words, these guides 60, close to the side edges of the web, guide it as it moves around the curved portion 61 of the platen 53 that connects its body to its extension 59.

The web is drawn upwardly on the tracker-board 51 by means of a traction roller 62 that is coaxial with the aforesaid gear wheel 21 (see Fig. 5) that meshes with the driving wheel 4 of the motor 1. If desired, the web may be provided along one edge with equidistant perforations to receive projecting spurs 63 that assist in developing tension in the web to draw it off of the supply roll 56. However, these spurs are not essential, and I prefer to employ also, a presser roller 64, the face of which lies adjacent to the face of the roller 62 so as to press lightly against the web as it passes up onto the roller 62. The roller 64 may be of cushion material such as rubber, fiber, or similar material.

Referring again to the severing device 45, it will be noted that the plate that forms the body of this device, extends downwardly so that its forward edge is located under the extension 59. This forward portion is formed into a cutting edge or knife 65 that extends transversely across the web. One of the aforesaid pintles 47 is provided with a rigidly attached lever 66 having a handle 67 that enables this lever to be swung upwardly when desired, to press the cutting edge or knife 65 against the web so as to clamp it against the extension 59. The web can then be pulled down from the tracker-board so as to exert tension on it in a downward direction and against the cutting edge 65 so as to sever it. When the web 56 passes off from the roller 62, it wraps around the take-up roller 38 which has already been described, and which is driven through the friction clutch 34 already described.

In order to facilitate mounting the take-up roller 38 in position between the end frame plates 6a and 6b of the recorder frame, I prefer to form each of these plates with a notch 68 extending into the same from its rear edge 69, and each head 70 of this roller has a stub shaft 71 (see Figs. 2 and 6) that fits into the forward end of its corresponding slot 68. At the right end of the roller as indicated in Fig. 2, the stub shaft 71 carries the hub 72 of the gear 21, which extends from the right-hand face of this gear over to an auxiliary frame plate 6c, the shape of which is indicated by the dotted line in Fig. 5. This plate operates as an outboard bearing for the gears and rollers where necessary, that are supported on the frame of the recorder. The hub 72 of the gear 42 has a reduced neck 73 that extends through the frame plate 6c and carries the thumb head 43 or knob already described, for rotating the roller 38 at will. This is permitted by reason of the friction clutch 34 included in the drive to the gear 33 that drives this roller 38.

At the left end of the roller 38 its shaft 74 extends beyond the frame plate 6a so that a projecting tip 75 is located at this point. This projecting tip 75 has a rounded end which enables it to be latched into an eye in a latch spring or plate 76 that is pressed yieldingly against the outer face of the frame plate 6a, and has an outwardly bent end 77 that operates as a handle for pulling the latch away from the frame plate 6a when the shaft 74 is passing up into its corresponding slot 68 in the frame plate 6a.

The frame plates are held spaced apart by three tie rods 78a, 78b, and 78c. The uppermost tie rod 78a has a reduced neck 79 on it, the outer end of which passes through the frame plate 6c and is threaded to receive a clamping nut 80 which is similar to a clamping nut 81 that clamps the frame plate 6b in position.

The instrument is preferably provided with means that can be used alternately with the take-up roller 38 to collect a roll composed of a substantially short length of web, for example, where it is desirable to have a record of a short run of the vehicle; or in a situation where the vehicle is operating on short runs between longer trips. In order to meet this situation, I utilize the presser roller 64 as a guide roller, and instead of running the web over to the take-up roller 38, I change its course, pass it over the top of the roller 64, and through an opening 82 that I provide in the cover wall of the housing 13. In this way, the free end of the web is directed into a pocket 83 having a substantially cylindrical wall section 84 in a super casing or auxiliary casing 85 that is mounted on the cover wall of the housing 13, preferably by means of a hinge connection 86. The bottom edge of this casing is formed with a flange 87, the extreme edge 88 of which is formed into a cutting edge. This auxiliary upper casing 85 may be latched in its closed position, or if desired, the hinge connection 86 may be provided with a coil spring 89 that yieldingly presses the casing 85 toward its closed position and against a short cleat 90 that is secured in a transverse position to the outer face of the cover wall of the casing.

In using this auxiliary collecting means for the web, after the short run of the vehicle is ended, the small casing 85 may be swung out away from the housing 13 to enable the roll of web within it to be removed, after which the web is pulled down past the cutting edge 88 far enough to carry the last recordings of the stylus past this cutting edge, after which the recorded portion of the web is torn off on this cutting edge 88.

If desired, the upper wall of the casing 13 may be provided with a lock 91 having a key-hole 92 through which a key may be inserted by an authorized person. This lock, however, only locks in the web that runs to the take-up roller 38 that is used in long runs of the vehicle.

When the instrument is not in use, the clock mechanism of the motor 1 should be stopped. Any suitable means may be employed for this purpose. For example, a stem 93 may be provided, that is guided through an opening in the cover wall of the housing 13. This stem is friction-tight and can be shoved in far enough to enable its forward end to come in the path of the teeth 94 of a small gear wheel 95 that is driven off the inner edge of the large gear wheel 4 that is driven by the clock mechanism, and which meshes with the gear wheel 21 on the shaft of the traction roller 62.

The clock motor may be wound whenever necessary, by a key applied on a winding stem 96 (see Fig. 2).

If desired, a window 97 indicated in dotted lines in Fig. 2, may be provided in the outer wall of the cover 13, through which counter-wheels may be visible, indicating the mileage of the vehicle.

The web 11 as indicated in Fig. 2, is provided with a plurality of arc-shaped lines 98 concentric with the axis of the shaft 9 of the arm 8. These arcs are numbered consecutively to represent five minutes of time between each adjacent pair of arcs. In other words, a time scale 99 is provided at the left edge of the web as indicated, and every twelfth arc has an hour number so that the record line 44 described by the stylus, indicates the speed of the vehicle at every time throughout the day when the vehicle has been in use.

It is evident that in the operation of this instrument, the web is driven by the clock motor regardless of whether the car carrying the instrument is moving or not. Hence the web gives a perfect and continuous record of the movements of the car; in other words, while the car is standing, the stylus on the arm 8 will rule a straight line extending longitudinally on the web, and as soon as the car starts, the stylus will commence to indicate the speed at all times during the trip that the car makes.

It is obvious that instead of employing the speedometer which indicates miles per hour, a tachometer can be employed to control the movements of the recording arm 8, and the transverse scale on the web will have numbers indicating the revolutions of the motor instead of carrying the scale indicating miles per hour as illustrated in Fig. 2.

Many other embodiments of the invention may be resorted to without departing from the spirit of the invention.

I claim as my invention:

1. In a speed recorder, the combination of a recorder frame, a tracker-board mounted on said frame, means for defining a supply roll pocket back of said tracker-board to receive a supply of recording web, means for drawing off the web from said roll at a substantially uniform speed, and for guiding the same across said tracker-board, said tracker-board including a panel pivotally supported on said recorder frame to swing on an axis extending transversely to the direction of advance of the web, and located at an elevated point with respect to said pocket, to facilitate placing a supply roll in said pocket; and severing means including a tearing edge extending longitudinally with the axis of said pocket and disposed adjacent to the path of the web in passing from said roll, to enable a portion of the web to be detached from the roll after a record has been taken upon the same.

2. A speed recorder according to claim 1, in which the said panel is formed with an extension projecting inwardly from said tracker-board and under the said pocket so as to operate as a supporting rest for the under side of the supply roll.

3. A speed recorder according to claim 1, in which the said panel includes an integral extension projecting inwardly from the same and under said pocket to form a cradle supporting the supply roll, the inner edge of said extension being turned inwardly toward the pocket to facilitate guiding the web from the roll at the side thereof remote from the tracker-board to guide the web under said extension and thence upwardly across the face of the tracker-board, said web being disposed between said extension and said severing means.

4. A speed recorder according to claim 1, in which the said panel includes an integral extension projecting inwardly from the same and under said pocket to support the supply roll, the inner edge of said extension being turned inwardly toward the pocket to facilitate guiding the web from the roll at the side thereof remote from the tracker-board so as to guide the web under said extension and thence upwardly across the face of the tracker-board, said web being disposed between said extension and said severing means; and including means for pivotally supporting the severing device to permit the same to be swung down at will out of the path of said extension when it is necessary to swing the platen outwardly for placing a supply roll in the pocket.

5. A speed recorder according to claim 1, in which the said panel includes an integral extension projecting inwardly from the same and under said pocket to support the supply roll, the inner edge of said extension being turned inwardly toward the pocket to facilitate guiding the web from the roll at the side thereof remote from the tracker-board to guide the web under said extension and thence upwardly across the face of the tracker-board, said web being disposed between said extension and said severing means; and including means for pivotally supporting the severing device to permit the same to be swung down at will out of the path of said extension when it is necessary to swing the platen outwardly for placing a supply roll in the pocket, and a spring for yieldingly urging a part of the severing device so as to press the web yieldingly against the said extension, thereby developing tension in the web as it is drawn across the tracker-board.

6. In a speed recorder, the combination of a recorder frame, a tracker-board mounted on said frame, means for defining a supply roll pocket back of said tracker-board to receive a supply of recording web, means for drawing off the web from said roll at a substantially uniform speed, and for guiding the same across said tracker-board, said tracker-board including a panel pivotally supported on said recorder frame to swing on an axis so as to open the pocket to facilitate placing a supply roll in said pocket, said tracker-board having an extension associated with said panel under which the web passes from said roll, and severing means including a tearing edge disposed adjacent to said extension to enable a portion of the web to be detached from the roll after a record has been taken upon the same.

7. In a speed recorder, the combination of a motor, a speed indicator spaced from the said motor and having a recording stylus with driving means for moving the stylus to and fro transversely with respect to an axial line joining the said motor and speed indicator, a web-carrying frame having web-driving mechanism for supporting and advancing the recording web in a direction extending longitudinally with respect to the said axial line and into driving position between said motor and said speed indicator, a driving wheel driven by the motor and mounted to rotate in a plane substantially parallel to said axial line; and a driven wheel carried on the web-carrying frame and also mounted to rotate in a plane parallel to said axial line so that the plane of the said driven wheel is parallel to the plane of the said driving wheel, thereby enabling the said driving wheel and driven wheel to mesh together by a relative sidewise movement of the same when the web-carrying frame is moved across said axial line, for effecting a driving connection from the motor to the said web-carrying mechanism.

8. A speed recorder according to claim 7, in which the said stylus is mounted so that it extends in the same general direction in which the web advances.

9. A speed recorder according to claim 7, including a take-up roller for collecting the recorded web mounted on said web-carrying frame, a guide roller carried in the web-carrying frame adjacent to said take-up roller and driven thereby, the axis of which is parallel to the axis of said take-up roller and across which the said web carrying the record may be passed if so desired, instead of wrapping on the take-up roller, and means for collecting the recorded web beyond said take-up roller.

10. In a vehicle speedometer for recording on a web, the combination of a casing having means for carrying a supply of web, a tracker board, a traction roller for drawing the web across the trackerboard, means for recording the speed of the vehicle on the web at the trackerboard, a take-up roller beyond the traction roller for normally collecting a continuous speed recording web when the vehicle is on a relatively long run, an auxiliary guide roller mounted in the casing adjacent the path of the web in passing from the trackerboard to the traction-roller, and over which the web may be passed when it is desired to make a recording of a relatively short run, and means beyond the auxiliary guide roller for collecting the record web of said short run.

11. A vehicle speedometer according to claim 10, in which the casing has an opening in its wall adjacent the auxiliary guide roller through which the web may be passed, and the said collecting means for the same located on the outer side of said casing.

12. In a vehicle speed recorder, the combination of a casing, a motor mounted in the casing, a speed recording instrument mounted in said casing and spaced from said motor, a web-carrying frame capable of fitting into the space between said motor and said recording instrument, means carried on said web-carrying frame for guiding and advancing a web to enable the speed recorder to make a record upon the same, means on the web-carrying frame for collecting the portion of said web that carries the speed record, and manually actuated severing means carried on the recorder frame for severing the recorded portion of the web accessible after the web-carrying frame has been removed from its place between the motor and the recording instrument.

13. A vehicle speed recorder according to claim 12 in which the web-guiding means includes a traction roller for advancing the web and includes an auxiliary guide roller adjacent the same for guiding the web on a relatively short run of the vehicle, said casing having a wall with an opening adjacent the guide roller through which the said guide roller feeds the portion of a recorded web, recorded during a relatively short run of the vehicle, for detachment on the exterior of said casing wall, and without necessitating the removal of the web-carrying frame from its place between the motor and the recording instrument.

EDWIN P. JONES.

References Cited in the file of this patent

UNITED STATES PATENTS

| Number | Name | Date |
|---|---|---|
| 982,021 | Renfro | Jan. 17, 1911 |
| 1,259,399 | Hopkins et al. | Mar. 12, 1918 |
| 1,347,676 | Bowdish | July 27, 1920 |
| 1,385,342 | Bruhn | July 19, 1921 |
| 1,492,559 | Ewing | May 6, 1924 |
| 1,564,634 | Side | Dec. 8, 1925 |
| 1,594,584 | Wofford | Aug. 3, 1926 |
| 1,973,354 | Nedberg | Sept. 11, 1934 |
| 2,341,118 | Rodanet | Feb. 8, 1944 |
| 2,412,639 | Traugott | Dec. 17, 1946 |